Jan. 5, 1954 J. RAE 2,664,642
GAUGE FOR MEASURING OR COMPARING
DIAMETERS OF CYLINDRICAL BODIES
Filed July 14, 1951 6 Sheets-Sheet 1
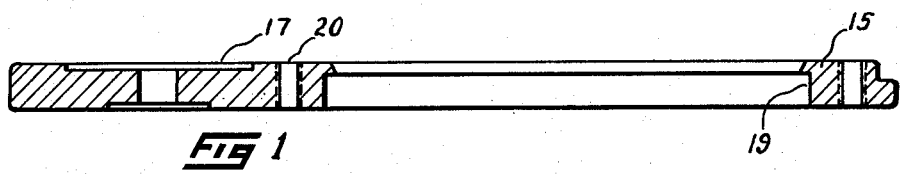
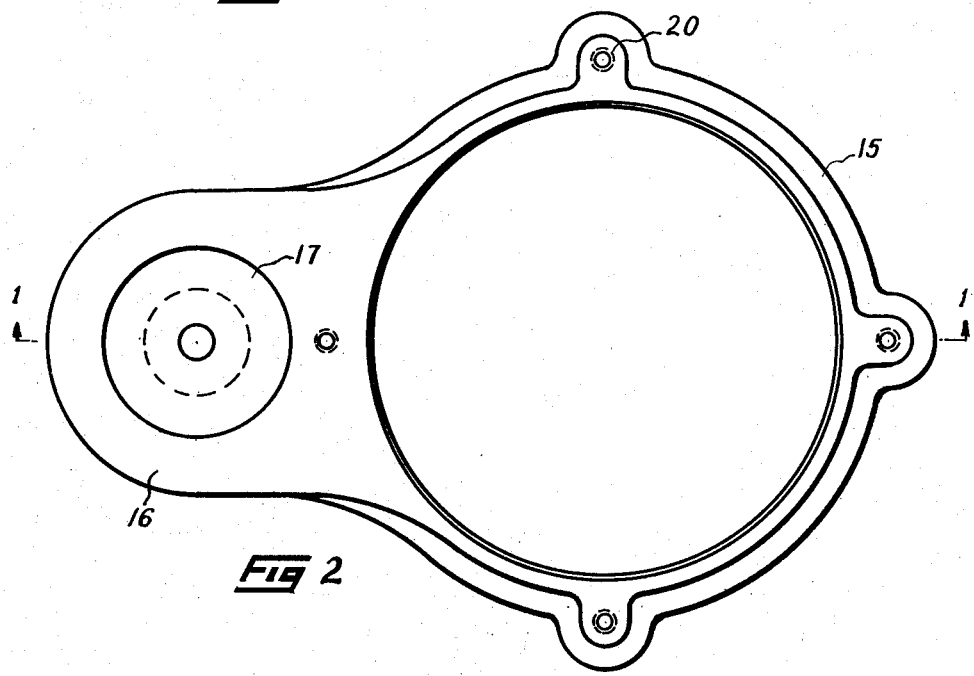

Jan. 5, 1954  J. RAE  2,664,642
GAUGE FOR MEASURING OR COMPARING
DIAMETERS OF CYLINDRICAL BODIES
Filed July 14, 1951  6 Sheets-Sheet 2
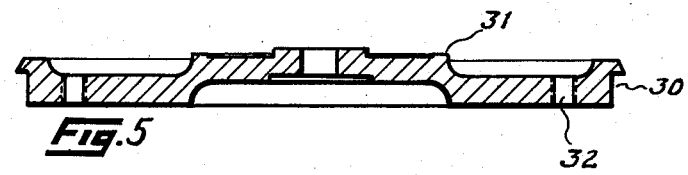
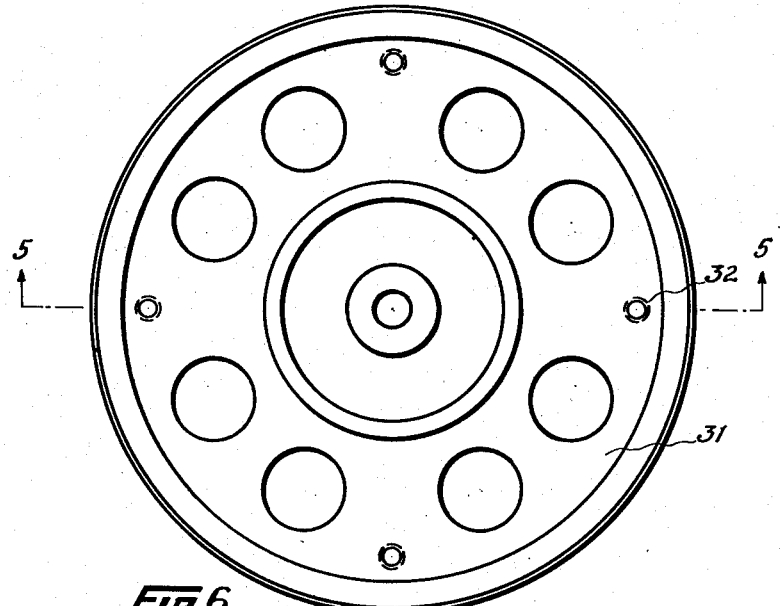
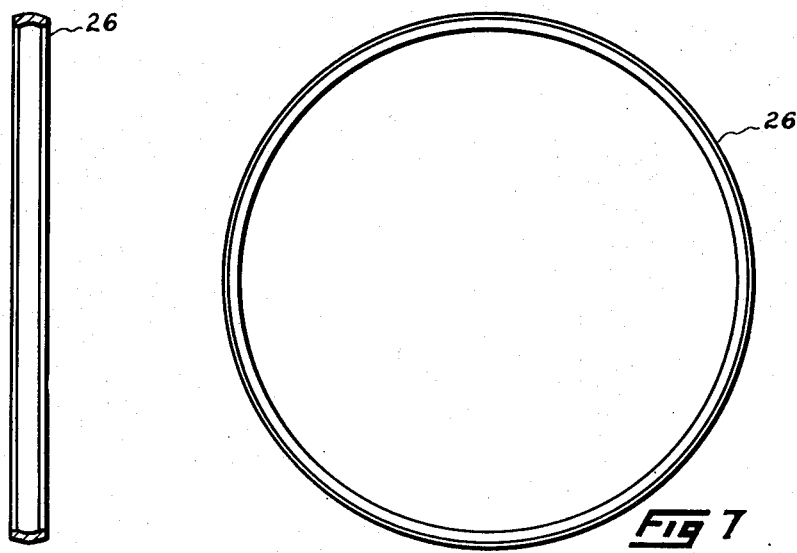
INVENTOR
JOHN RAE
BY: Haseltine, Lake & Co.
AGENTS Jan. 5, 1954 J. RAE 2,664,642
GAUGE FOR MEASURING OR COMPARING
DIAMETERS OF CYLINDRICAL BODIES
Filed July 14, 1951 6 Sheets-Sheet 3

INVENTOR
JOHN RAE
by:
Haseltine, Lake & Co.
AGENTS

Jan. 5, 1954

J. RAE 2,664,642

GAUGE FOR MEASURING OR COMPARING
DIAMETERS OF CYLINDRICAL BODIES

Filed July 14, 1951

INVENTOR
JOHN RAE

Patented Jan. 5, 1954

2,664,642

UNITED STATES PATENT OFFICE 2,664,642

GAUGE FOR MEASURING OR COMPARING DIAMETERS OF CYLINDRICAL BODIES

John Rae, Sydney, New South Wales, Australia, assignor of one-half to Blaxland Rae Pty. Limited, Sydney, New South Wales, Australia, a corporation of New South Wales Application July 14, 1951, Serial No. 236,756

Claims priority, application Australia July 14, 1950

10 Claims. (Cl. 33—178)

This invention relates to an improved gauge for the measurement or comparison of internal or external diameters of cylindrical bodies. The gauge of the present invention is particularly adapted for measurement within fine limits of accuracy.

The internal or external diameters of cylindrical bodies are at present measured or compared by a variety of means such as micrometer calipers, adjustable snap gauges, diameter dial gauges, plug and ring gauges and air gauges. All these means are more or less successfully applied to the measurement of diameters. An out-of-round condition is, however, frequently present and is rarely completely absent in the case of thin-walled pieces such as cylinder liners, press fitted bushes and the like. This out-of-round condition, while not detracting from the usefulness of the piece, does interfere with the effectiveness of the gauging devices at present in use. In using single diameter instruments of the type mentioned above, it is necessary to take the mean of several observations to establish an approximate mean diameter. The result obtained is liable to variation with the number and position of the diameters observed or measured. In the case of thin-walled pieces some instruments which employ pressure may cause the part to yield at the diameter being measured, thus introducing a non-compensatable error. Instruments which are susceptible to the "feel" of the user, introduce errors due to the variability of human touch. Such errors cannot be eliminated even by taking the average of a number of measurements. Measurement with multijet air gauges will often meet requirements, 3 to 5 diameters being measured and averaged simultaneously. The range of such equipment is, however, limited, and it is possible that conditions may arise in which a considerable out-of-round condition added to a range of sizes to be measured, can exceed the range of such equipment. Moreover, the stated disadvantages of single-diameter instruments are not eliminated, but are reduced only in degree.

It is an object of the present invention to provide a gauge for measuring or comparing the internal or external diameters of cylindrical bodies which will substantially overcome the above-mentioned disadvantages and which can be used to obtain relatively accurate readings in a comparatively short time.

It has been found that when a flexible ring (flexible diametrally only) of known profile and known outer peripheral length slightly exceeding the bore of the cylindrical body to be measured, is brought into intimate contact with the internal walls of the bore, it assumes an elliptical shape in its own plane, selecting the particular elliptical plane of the cylinder which has a periphery equal to its own calculable length along the line of contact. This particular elliptical plane is inclined at an angle to the plane normal to the longitudinal axis of the cylinder. The measurement of the inclination of the major axis of the elliptical plane indicated by the flexible ring to the plane normal to the longitudinal axis of the cylinder gives an indication of the internal diameter of the bore, the latter being a function of the angle of inclination or movement from normal in tilt. Furthermore, the movement from normal in tilt is a very substantial amplification of the difference between the diameter of the ring and that of the bore, which amplification permits an extremely accurate determination of the bore. It has also been found that flexible rings of suitable material are positive in their positioning, that is to say, they are not sensitive to the "feel" of the user; further, it has been found that within practical limits, out-of-round conditions in the diameters being measured, do not impair the accuracy of the observed results.

Similarly, the outside diameter of a cylindrical body can be determined by placing a flexible ring having a diameter slightly larger than the diameter to be measured, over the body, tilting it, simultaneously distorting it, until it comes into contact with the outside surface of the cylinder along the periphery of an ellipse in a plane inclined to a plane normal to the cylinder axis, and then measuring the inclination of the ring to that plane.

Accordingly, in its most general form the present invention provides a gauge for measuring or comparing internal or external diameters of cylindrical bodies, comprising a ring having a contact diameter slightly larger than the diameter to be gauged, the ring being flexible diametrally, i. e. flexible in its own plane, and substantially inflexible in any other plane.

According to a preferred form of the invention, the gauge comprises a ring, which is flexible diametrally and which has a contact diameter slightly larger than the diameter to be measured, and means for measuring the movement in tilt of the ring, when the contact surface of the ring closely engages the periphery of the body being gauged.

By "contact diameter" is meant the internal diameter when cylinders are being gauged externally, and vice versa. By "movement in tilt" is meant, in general, the departure of the elliptical plane of the distorted ring from a plane through one end of the major axis of the elliptical plane normal to the cylinder axis. This movement may be indicated, for example, by the angle of tilt or inclination of the major axis of the elliptical plane to the normal plane or in other ways.

The invention also includes a method of measuring or comparing the internal or external diameters of cylindrical bodies using flexible rings having the characteristic features described above.

The flexible ring may be held in a holder so that it can move or be distorted only in its own plane, i. e. it is flexible diametrally, but cannot move in any other plane. For measuring internal diameters, the working or contact face of the ring is on the outside, while for measuring outside diameters the working face is on the inside of the ring. The ring may be of any suitable section, but for normal purposes it is desirable that the ring be substantially crescent or D-shaped in section, the arcuate portion forming the working face. The ring is preferably constructed of a material which is wear-resisting and of high elasticity modulus. For the purposes of the present invention, a ring made from carbon steel with a hard chromium surface is eminently suitable.

As the ring has a substantial depth relative to its radial thickness there is no tendency to corrugate and the ring may be used with or without a holder.

If the cylindrical body being measured be mounted with its longitudinal axis truly vertical (or truly horizontal), the angle of tilt may be measured by means of a liquid bubble vial integrally mounted with the holder, a circular vial being convenient as it allows latitude in the location of the major axis. Since the diameter to be measured is a function of the angle of tilt (and constants), the vial cover can be calibrated to read directly in terms of diameters.

Alternatives to the above means of measuring the angle of tilt are numerous; any instrument capable of lineal measurement can be employed; in this category are simple rules, vernier and micrometer depth gauges and calipers, amplifying dial gauges, electronic and optical amplifying devices, all of varying degrees of sensitivity appropriate to the particular needs of the application. Any instrument capable of angular measurement can also be employed; in this category are clinometers, fluid bubble vials, electronic and optical amplifying devices.

When the ring profile is of crescent section as shown in Figs. 10 and 11 of the accompanying drawings it may be shown that substantially the external cylinder diameter to be measured is equal to the known ring diameter less $A^2/C$ where $A$ is the measured angle of inclination and $C$ is a constant for the particular ring. Similarly, the internal diameter to be measured is equal to the known ring diameter less $A^2/C$ where $A$ and $C$ are defined as above. The constant $C$ is influenced by the radius of the ring profile and it has been found that greater sensitivity is achieved with I. D. gauges when the radius is relatively large and with O. D. gauges when the radius is relatively small.

The invention will be better understood by reference to the accompanying drawings wherein:

Figs. 1, 2, 3 and 4 show the construction of a gauge for measuring or comparing external diameters of the order of four inches, Fig. 1 being a cross section of Fig. 2 on line 1—1;

Fig. 2 is a plan view of the holder, Fig. 3 a plan view of the flexible ring and Fig. 4 a cross section of the flexible ring;

Figs. 5, 6, 7, 8 and 9 show the construction of a gauge for measuring or comparing internal diameters of the order of four inches, Fig. 5 being a cross section of Fig. 6 on the line 5—5, Fig. 6 a plan view of the ring holder, Fig. 7 a plan view of the flexible ring, Fig. 8 is a cross section of the ring and Fig. 9 is side view partly in section of the bubble vial supporting means;

Figure 9:
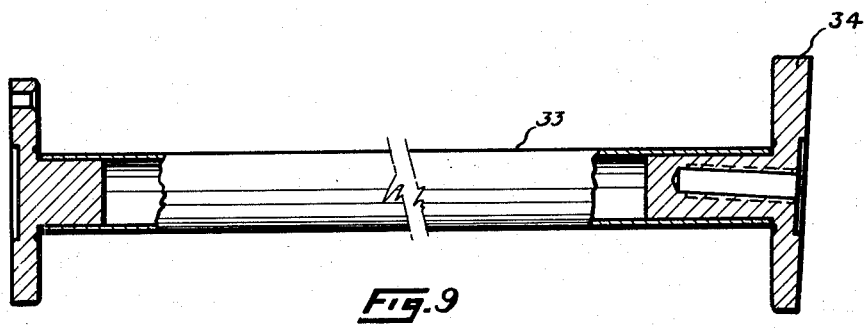
Figure 10:
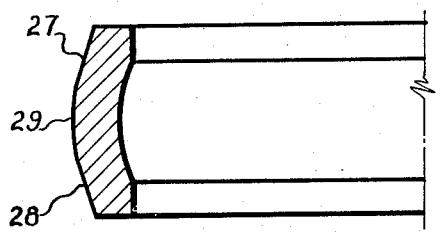
Figs. 10 and 11 are enlarged fragmentary sectional elevations showing the profile of the internal diameter measuring ring and the external diameter measuring ring respectively.
Figure 11:
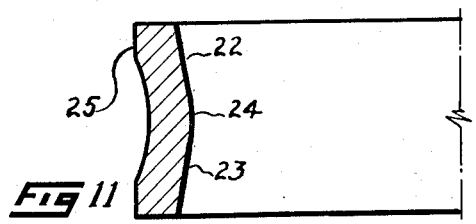

Referring now to Figs. 1 to 4 in particular the gauge for measuring or comparing external diameters comprises a holder 15 which is substantially ring shaped and which is provided with a projection 16. A bubble vial (not shown) is mounted on a seating 17 provided in the projection 16 which may also serve as a handle. A flexible ring 18 is secured in a recess 19 on the inner face of the holder 15 by means of retaining washers held by small screws (not shown) located in threaded holes 20. The profile of the ring, which is more clearly shown in Fig. 11, is more or less crescent or D-shaped in section. Two similar conical faces 2 and 23 converge inwardly at an angle of approximately 10° from the edge of a cylindrical outer face 25, which is substantially parallel to the ring axis. The converging faces 22 and 23 are joined by a part toroidal central working face 24 of about ⅛ inch radius. The ring is ¼ inch wide axially and 1/16 inch thick radially. About 3/64 inch of the toroidal face 24 formes the working surface of the ring.

For the range of diameters measured by a particular ring each part of this arcuate working surface comes into use upon one occasion or another, thus affording a greater resistance to wear than would a ring of, say, triangular section. The ring 18 is constructed from carbon steel ground to the required profile, and then coated with a chromium wearing surface.

The diameter of the groove 19 must be greater than the undistorted external diameter of the ring 18 so as to accommodate the elliptical shape assumed by the ring when the ring is distorted. The clearance between the face 25 of the ring and the walls of groove 19 and between the side of the ring and the retaining washers must be sufficient to permit relative rotation of the ring and holder but insufficient to permit movement of the ring except in its own plane.

The bubble vial is preferably mounted on the projection 16 so that when the holder is in a horizontal plane, i. e. when the angle of inclination is zero, the bubble is on the periphery of the vial. This doubles the range of diameters to be measured, which may be indicated by various bubble positions as compared with the range if the bubble is central when the angle of inclination is zero. The glass cover of the vial chamber is provided with a scale calibrated to read directly in diameters, each graduation on the scale representing 2/10000 of an inch.

The appropriate formula or the theoretical curve of diameter plotted against the angle of inclination may be utilised to predict the positions of the graduations on the scale. Final calibration may then be determined or checked by entering the gauge into one or more master gauges of certified size from which control calibrations, the intermediate positions are located by reference to the curve or formula. By this means the effects of any irregularities of manufacture are eliminated. Alternatively, the bubble vial may be calibrated by a purely empirical method using master gauges of certified size.

A gauge suitable for the measurement of internal diameters will now be described with particular reference to Figs. 5 to 10 of the drawings.

The flexible ring 26 is similar to that shown in Figs. 3, 4 and 11 except that the working face is on the external face, being provided with converging faces 27 and 28 and a central toroidal portion 29 of ½" radius. The ring 26 is rotatably held in a shouldered recess 30 formed on the periphery of a disc shaped holder plate 31 by means of the heads of four circumferentially spaced screws (not shown) screwed into the threaded holes 32. The diameter of the recess 30 is less than the undistorted internal diameter of the ring to accommodate the elliptical shape assumed by the ring when the ring is distorted. A post or handle 33 is secured to the centre of the holder 31 and at the top is provided with a bubble vial (not shown). The base 34 of the post is slightly inclined to the axis of the post so that the bubble is on the periphery of the vial when the angle of inclination is zero i. e. when the ring 26 lies in a horizontal plane. This doubles the range of the gauge as has been described above in connection with the O. D. gauge. The glass cover of the vial is calibrated in the same way as that of the O. D gauge.

Figure 13:
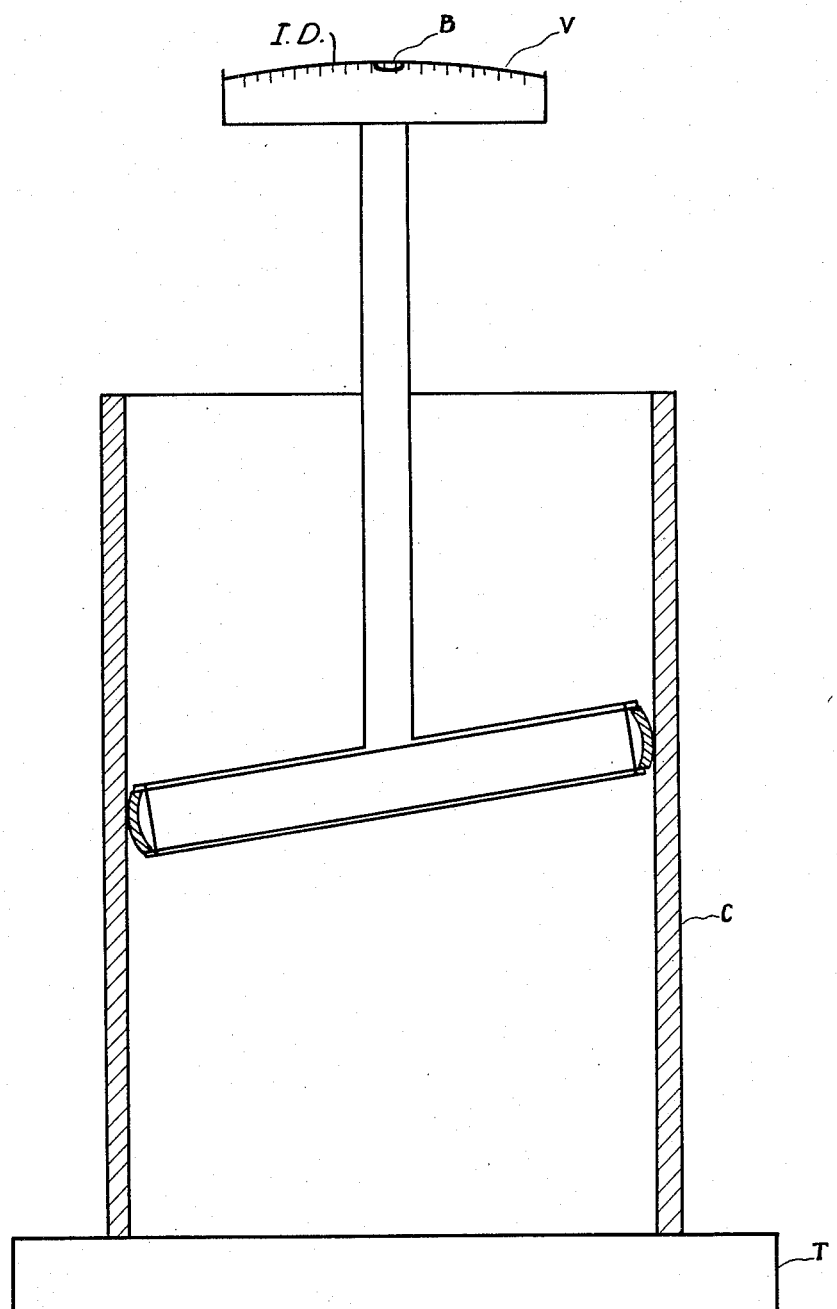
Figs. 13 and 14 are diagrammatic views showing the position assumed by the gauges described with reference to Figs. 5 to 7 and 1 to 4 respectively during the measurement of internal and external diameters respectively.
Figure 14:
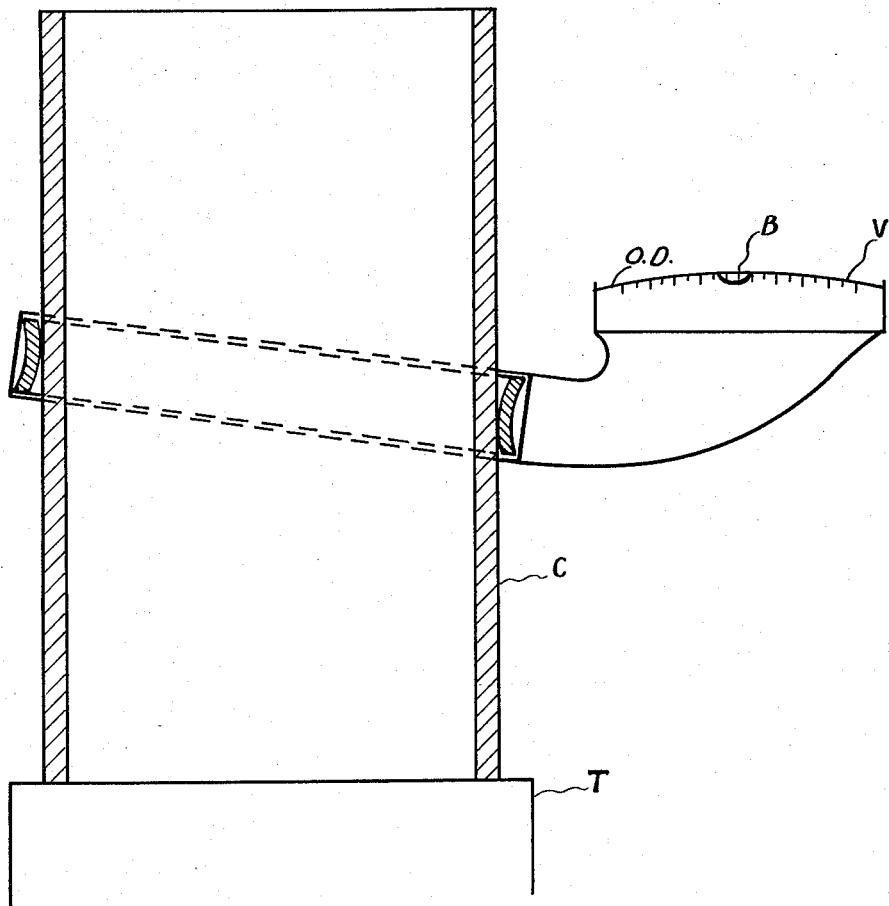

The use of the gauges will now be described with reference to Figs. 13 and 14 of the drawings. The cylinder to be measured is placed on a levelled horizontal table T with the longitudinal axis vertical.

The I. D. gauge is inserted into the cylinder at an extreme angle. Slight flattening of the ring will occur at diametrally opposite points, and the ring will virtually contact the cylinder walls only at these points. At the position in the cylinder at which the diameter is to be measured the gauge is tilted back using a minimum of pressure until the distorted ring is in firm contact with the cylinder wall for the whole of the ring periphery as shown in Fig. 13. The diameter of the body is then read from the centre of the bubble B against the vial scale V.

Similarly to measure the external diameter the O. D gauge is slipped over the cylinder and at the selected position is tilted and simultaneously distorted until it comes into contact with the outside surface of the cylinder along the whole of the periphery of an ellipse in a plane inclined to a plane normal to the cylinder axis. The diameter is then read from the centre of bubble B against the vial scale V.

Figure 12:
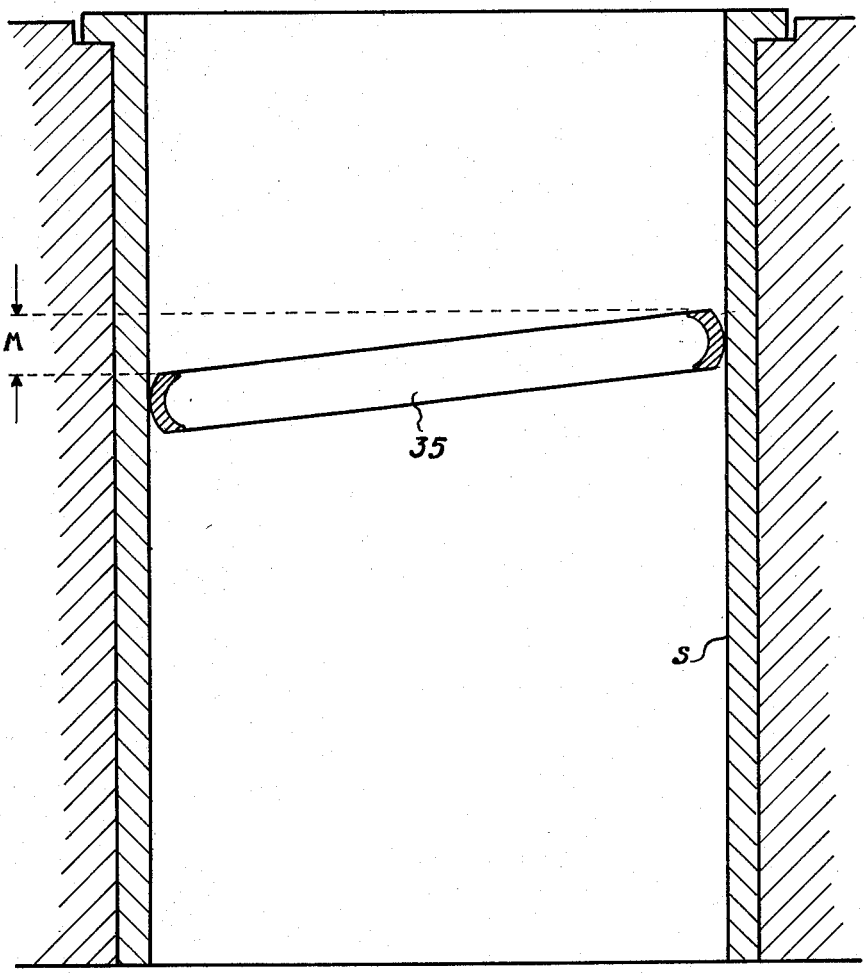
Fig. 12 is a diagrammatic view showing the position assumed by the ring when measuring the internal diameters of a tractor sleeve.

To illustrate the effectiveness and simplicity of the present invention a typical example of the measurement of the internal diameter of a tractor sleeve will now be described with reference to Fig. 12 of the drawings.

A flexible ring 35 constructed in accordance with the invention suitable for the measurement of diameters of the order of 3.7/8 inches has a peripheral diameter, i. e. peripheral length divided by $\pi$, of 3.87700". The characteristic curve for this ring shows the following values for M and corresponding values for D where M is the movement in tilt of the ring (see Fig. 12) and D is the difference between the ring diameter and the work diameter:

| M | D |
|---|---|
| Inches | Inches |
| 0.075 | 0.00033 |
| 0.080 | 0.00038 |
| 0.085 | 0.00043 |
| 0.090 | 0.00048 |
| 0.095 | 0.00053 |

The ring 35 is entered into the tractor sleeve S and is tilted into the engaged position. A pocket rule, used as a depth gauge reads M to be 0.080" and 0.090" at opposite ends of the bore; by repetition the M being accurate to ±0.005". Reference to the table shows that the corresponding values of D are 0.00038" and 0.00048". Accordingly the diameters of the work are 3.87700−0.00038=3.87662" and 3.87700−0.00048=3.87652", the result being accurate to ±0.00005".

The gauges of the present invention are particularly suitable for measuring thin-walled cylindrical bodies in which an out-of-round condition exists, since they employ circumferential measurements instead of diametral measurements. The fixed length of the gauging ring eliminates the need for individual lineal measurements of the circumference, and substitutes therefor individual angular measurements which are in general more susceptible of amplification and accurate observation than are lineal measurements. In addition, the original lineal movement of the extremities of the major axis of the gauging ring (i. e. the movement in tilt or inclination) represents a substantial preliminary amplification of the corresponding diametral changes in the work. For example, the movement in tilt of a 3.8770" diameter flexible ring is 0.150" for a bore range of 3.8764" to 3.8734". The amplification factor is equal to the movement in tilt divided by the change in the diameter of the work, i. e.

$$\frac{0.150}{0.003} = 50$$

This substantial preliminary amplification factor coupled with a secondary amplification available in measuring the angle of inclination gives a total amplification factor as high as can conceivably be required.

The gauges of the present invention are rapid in operation, require no adjustment, "repeat" unfailingly, are complete in themselves, are unaffected by "out-of-round" conditions in the work, are not sensitive to the operator's "feel" and do not distort thin-walled sections to give false results. They are of very light weight thus minimizing operator fatigue.

The gauges of the present invention thus provide means for measuring iternal and external diameters independent of out-of-round conditions, within extremely fine limits of accuracy and relatively quickly.

I claim:

1. A gauge for measuring or comparing diameters of cylindrical bodies comprising a ring having a contact diameter larger than the diameter to be gauged, being substantially D shaped in cross section the working face having two similar conical portions converging inwardly and being joined by a part toroidal central portion and having a substantial depth relative to its radial thickness so that it is flexible in its own plane and substantially inflexible in any other plane.

2. A gauge for measuring or comparing diameters of cylindrical bodies comprising a ring having a contact diameter larger than the diameter to be gauged, being substantially D shaped in cross section with the arcuate portion constituting the working face and having a substantial depth relative to its radial thickness so that it is flexible diametrally and means for measuring the movement in tilt of the ring when the contact surface of the ring closely engages the periphery of the body to be gauged.

3. A gauge for measuring or comparing diameters of cylindrical bodies comprising a ring having a contact diameter larger than the diameter to be gauged, being substantially D shaped in cross section with the arcuate portion constituting the working face and having a substantial depth relative to its radial thickness so that it is flexible diametrally, a holder for the said ring and a fluid bubble vial secured to the holder to measure the movement in tilt of the ring when the contact surface of the ring closely engages the periphery of the body to be gauged.

4. A gauge for measuring or comparing internal diameters of cylindrical bodies comprising a disc-shaped member provided with a peripheral recess, a ring fitted in said recess, said ring having a contact diameter larger than the diameter to be gauged, being substantially D-shaped in cross section with the arcuate portion facing outwardly and constituting the working face and having a substantial depth relative to its radial thickness so that it is flexible diametrally, a post secured to said disc member and a fluid bubble vial secured to the post to measure the movement in tilt of the ring when the contact surface of the ring closely engages the interior surface of the body to be gauged.

5. A gauge for measuring or comparing internal diameters of cylindrical bodies as claimed in claim 4 wherein the fluid bubble vial is calibrated to read directly in diameters.

6. A gauge for measuring or comparing external diameters of cylindrical bodies comprising a substantially ring shaped holder provided with an external projection and a recess on its internal periphery, a ring fitted in said recess, said ring having a contact diameter larger than the diameter to be gauged, being substantially D-shaped in cross section with the arcuate portion facing inwardly and constituting the working face and having a substantial depth relative to its radial thickness so that it is flexible diametrally, and a fluid bubble vial secured to said projection to measure the movement in tilt of the ring when the arcuate contact surface of the ring closely engages the exterior surface of the body to be gauged.

7. A gauge for measuring or comparing external diameters of cylindrical bodies as claimed in claim 6 wherein the fluid bubble vial is calibrated to read directly in diameters.

8. A gauge for measuring or comparing diameters of cylindrical bodies comprising a holder, a ring fitted to said holder, said ring being substantially D-shaped in cross section with the arcuate portion constituting the working face, having a depth of the order of four times its radial thickness and the diameter of the ring being such that when the arcuate working surface closely engages the surface of the body to be gauged the ring and the holder are inclined to the diametral plane of the body and an instrument capable of angular measurement secured to the holder to measure the movement in tilt of the ring.

9. A gauge for measuring or comparing internal diameters of cylindrical bodies comprising a disc shaped member provided with a peripheral recess, a ring fitted in said recess, which recess has a diameter less than the undistorted internal diameter of the ring, said ring having a contact diameter larger than the diameter to be gauged, being substantially D-shaped in cross section with the arcuate portion facing outwardly from the holder and constituting the working face and having a substantial depth relative to its radial thickness so that it is flexible in its own plane and substantially inflexible in any other plane, a post secured at one end to the centre of the disc member and a fluid bubble vial secured to the other end of the post, the vial being calibrated to read directly in diameters.

10. A gauge for measuring or comparing external diameters of cylindrical bodies comprising a substantially ring shaped holder provided with an external projection and a shouldered recess on its internal periphery, a ring fitted in said recess which recess has a diameter greater than the undistorted external diameter of the ring, said ring having a contact diameter larger than the diameter to be gauged, being substantially D-shaped in cross section with the arcuate portion facing inwardly and constituting the working face and having a substantial depth relative to its radial thickness so that it is flexible in its own plane and substantially inflexible in any other plane, and a fluid bubble vial calibrated to read directly in diameters secured to said projection.

JOHN RAE.

References Cited in the file of this patent

UNITED STATES PATENTS

| Number | Name | Date |
|---|---|---|
| D. 33,674 | Bliss | Dec. 11, 1900 |
| 25,154 | Wehle | Aug. 16, 1859 |
| 86,308 | Jones | Jan. 26, 1869 |
| 324,553 | Hanf | Aug. 18, 1885 |
| 2,546,154 | Gardner | Mar. 27, 1951 |
| 2,580,412 | Darmody | Jan. 1, 1952 |

FOREIGN PATENTS

| Number | Country | Date |
|---|---|---|
| 74,415 | Sweden | May 31, 1932 |